US008892681B2

(12) United States Patent
Basso et al.

(10) Patent No.: US 8,892,681 B2
(45) Date of Patent: Nov. 18, 2014

(54) PEER TO PEER METADATA DISTRIBUTION

(75) Inventors: Andrea Basso, Marlboro, NJ (US);
David Parisi, Dayton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 217 days.

(21) Appl. No.: 13/039,885

(22) Filed: Mar. 3, 2011

(65) Prior Publication Data
US 2012/0226769 A1 Sep. 6, 2012

(51) Int. Cl.
| G06F 15/16 | (2006.01) |
| H04N 21/845 | (2011.01) |
| H04L 29/08 | (2006.01) |
| H04N 21/84 | (2011.01) |
| H04N 21/258 | (2011.01) |
| H04N 21/41 | (2011.01) |
| H04L 29/06 | (2006.01) |
| H04N 21/81 | (2011.01) |
| H04N 21/24 | (2011.01) |
| H04N 21/658 | (2011.01) |

(52) U.S. Cl.
CPC ........ *H04L 67/2804* (2013.01); *H04N 21/8456* (2013.01); *H04L 67/306* (2013.01); *H04N 21/84* (2013.01); *H04N 21/25866* (2013.01); *H04N 21/4126* (2013.01); *H04L 65/4076* (2013.01); *H04N 21/8133* (2013.01); *H04N 21/2408* (2013.01); *H04N 21/6582* (2013.01)

USPC ........................................... 709/217

(58) Field of Classification Search
USPC .......... 707/217, 219, 226; 709/231, 217, 218, 709/226, 219, 203, 206, 216
See application file for complete search history.

(56) References Cited

U.S. PATENT DOCUMENTS

| 7,733,808 | B2 | 6/2010 | Hu et al. | |
| 2004/0268390 | A1* | 12/2004 | Ibrahim Sezan et al. | 725/35 |
| 2005/0120390 | A1 | 6/2005 | Nonoyama | |
| 2005/0203927 | A1* | 9/2005 | Sull et al. | 707/100 |
| 2007/0038612 | A1 | 2/2007 | Sull et al. | |
| 2007/0277205 | A1 | 11/2007 | Grannan | |
| 2009/0327894 | A1* | 12/2009 | Rakib et al. | 715/719 |
| 2011/0072463 | A1* | 3/2011 | Zaslavsky et al. | 725/41 |

* cited by examiner

*Primary Examiner* — Vivek Srivastava
*Assistant Examiner* — Normin Abedin
(74) *Attorney, Agent, or Firm* — Akerman LLP; Michael K. Dixon; Roy P. Zachariah

(57) ABSTRACT

A metadata distribution node includes a memory configured to store metadata. The metadata includes description information such as a description of a segment of a content item or social commentary on the content item. The metadata distribution node further includes a processor configured to receive a user profile from a client device, identify a portion of the metadata based on the user profile, and provide the portion of the metadata to the client device.

12 Claims, 7 Drawing Sheets

PEER TO PEER METADATA DISTRIBUTION

FIELD OF THE DISCLOSURE

The present disclosure generally relates to communications networks, and more particularly relates to peer to peer metadata distribution.

BACKGROUND

A multimedia service provider makes available multimedia content from different content providers to a user via a data network. It is typically useful for the service provider to also provide metadata for the provided content. The service provider uses the metadata to develop content guides that identify the content that is available to the user. For example, metadata obtained from a video content provider can be used to develop an electronic program guide (EPG).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
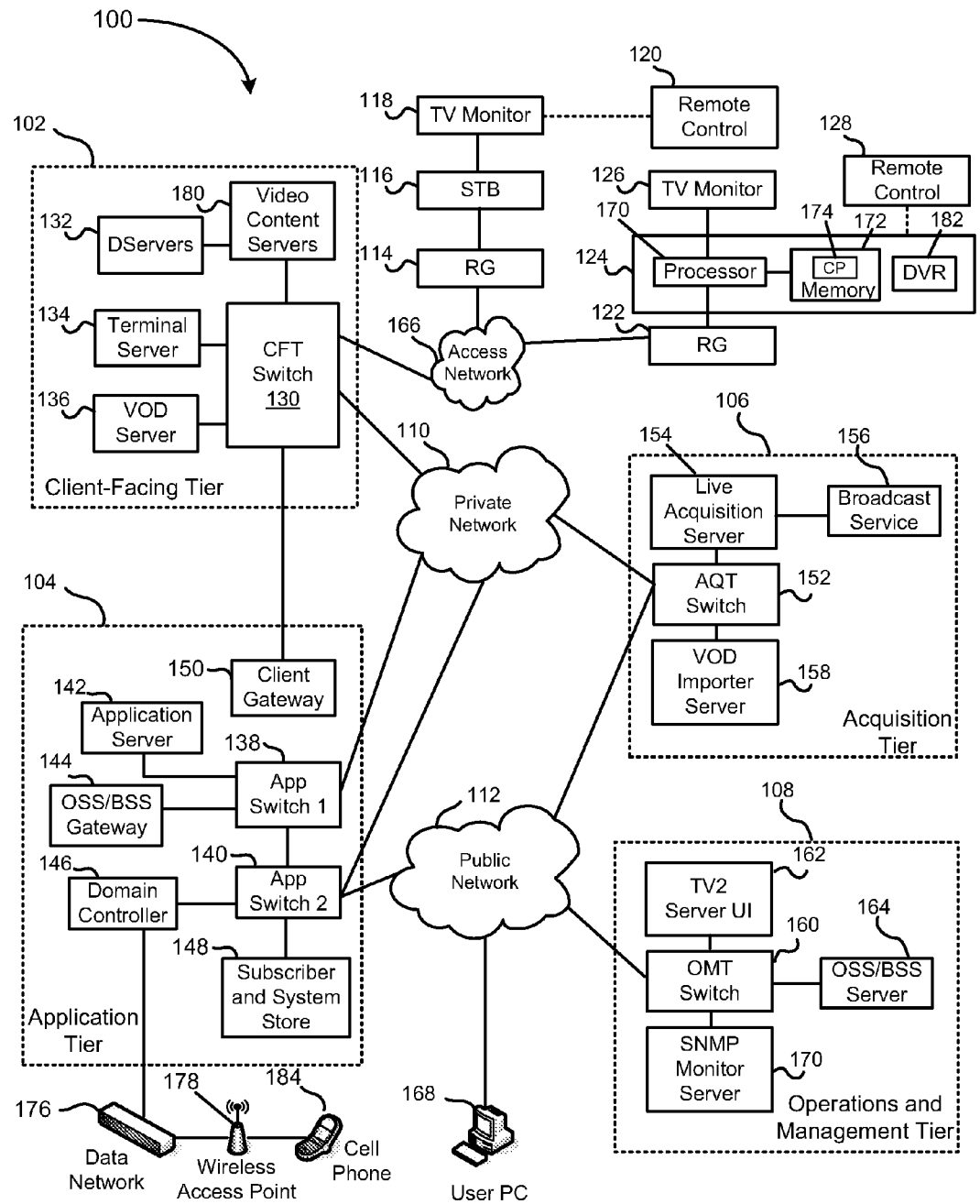
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, residential gateways (RGs) such as a first RG 114 and a second RG 122 can be coupled to the private access network 166. The client-facing tier 102 can communicate with a first representative set-top box device 116 via the first RG 114 and with a second representative set-top box device 124 via the second RG 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the RGs 114 and 122 via fiber optic cables. Alternatively, the RGs 114 and 122 can be digital subscriber line (DSL) RGs that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the RGs 114 and 122 via the private access network 166. The set-top box devices 116 and 124 can receive the television content from the RGs 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
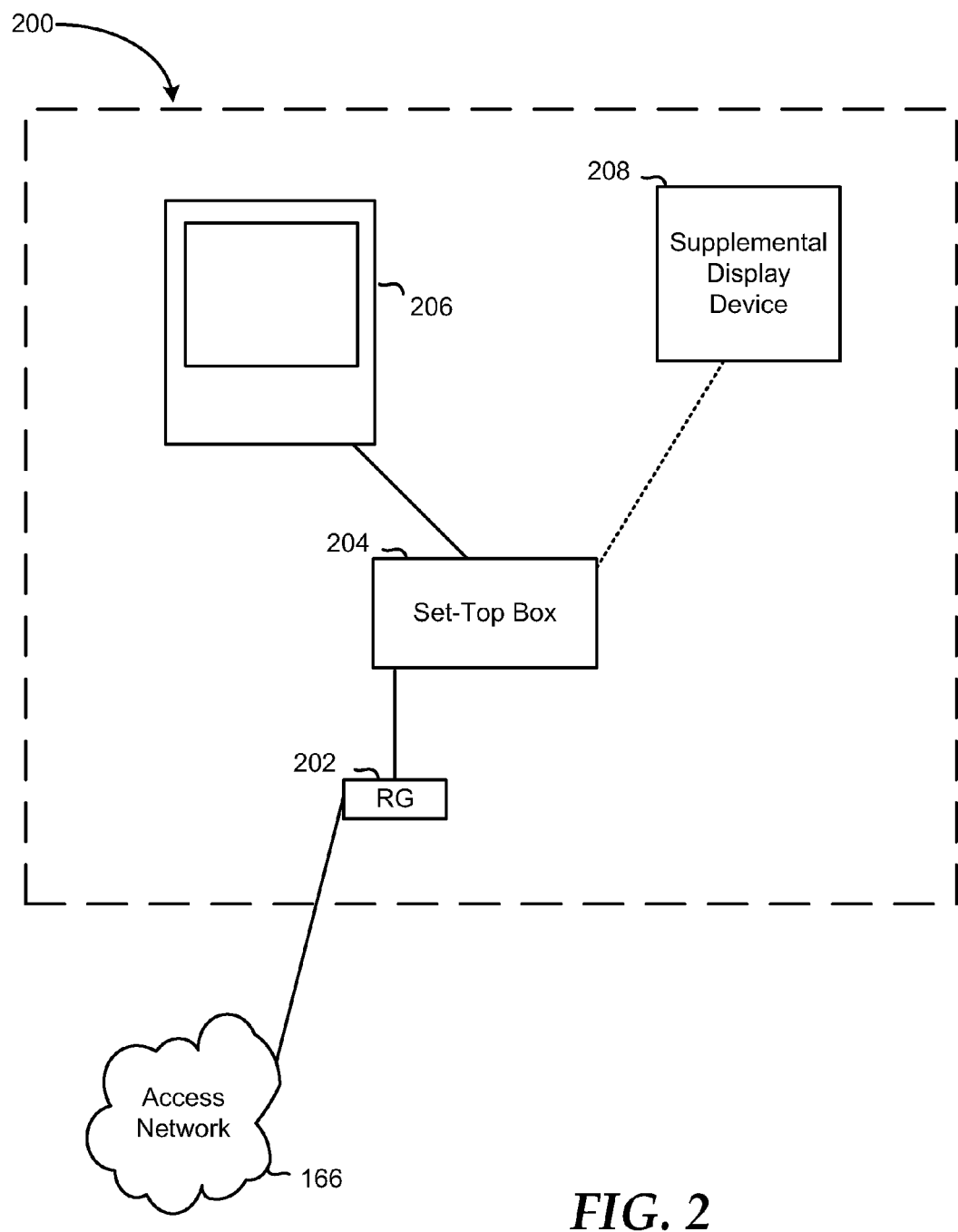
FIG. 2 is a block diagram illustrating client equipment in accordance with an embodiment of the present disclosure.

FIG. 2 shows a client premises 200 that communicates with a network such as IPTV network 100. The client premises 200 can include an RG 202, a set-top box device 204, a display device 206, and a supplemental display device 208. The RG 202 can be similar to RG 114 or 122 and can communicate with access network 166. The set-top box device 204 can be coupled to the display device 206, such as a television monitor. Additionally, the set-top box device 204 can communicate with supplemental display device 208. Generally, the supplemental display device 208 can be a device capable of displaying text or video information, and able to be located in proximity to display device 206. For example, the supplemental display device 208 can include a remote control with a video display, a tablet device, a personal computer such as a laptop, a cellular phone, or the like. The supplemental display device can receive and display metadata provided by the set-top box 204. The metadata can include information about the content currently being displayed on the display device 206, or other content that is currently available or will be available for display on the display device 206.

For example, the metadata can include a description of an entire content item or a segment of the content item. In an example, the metadata can include information such as information about actors in a scene, information about different camera angles available for the content, or information about players in a segment of a sporting event, such as a play of a football game, a heat of a meet such as a track meet or a swim meet, or an at-bat of a baseball or softball game. Additionally, the metadata can include social commentary on the content item, such as information posted on Facebook, Twitter, or other social networking websites. In a particular example, the supplemental display device can display the names of players on the field during a play of a football game, and can link to team or player statistics. Further, the supplemental display device can display commentary about the play from social networking sites and professional commentators, such as radio and television commentators.

Figure 3:
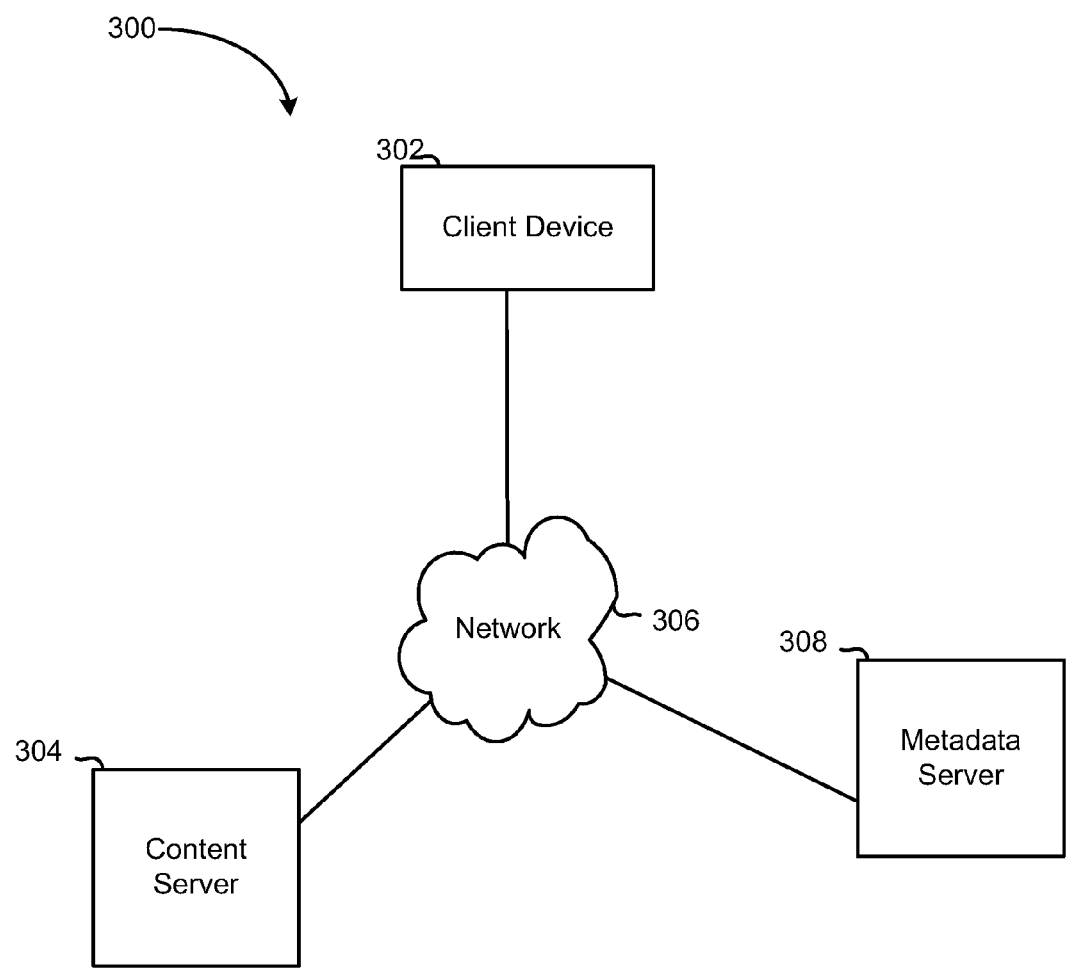
FIG. 3 is a block diagram illustrating a communication between a client device and content and metadata servers in accordance with an embodiment of the present disclosure.

FIG. 3 shows a system 300 for a distribution of content and metadata to a client device 302. The client device 302 can be a set-top box, a network enabled television, a computer, including a laptop or a desktop system, a tablet, a smart phone, or another device receiving and accessing content. The client device 302 can receive content, such as video or audio content, from a content server 304 through a network 306. Additionally, the client device 302 can receive metadata from a metadata server 308. The content server 304 and the metadata server 308 can be operated by the same service provider or can be operated by different service providers.

In an embodiment, the client device 302 may synchronize the metadata with the content being played back. For example, when the metadata relates to a particular portion of the content, the client device 302 can synchronize the metadata to be displayed during the particular portion of the content. In a particular embodiment, the content stream and the metadata stream can each include a timestamp to enable synchronization. The client system can buffer each of the content stream and the metadata stream and play back both streams in a synchronized manner.

Figure 4:
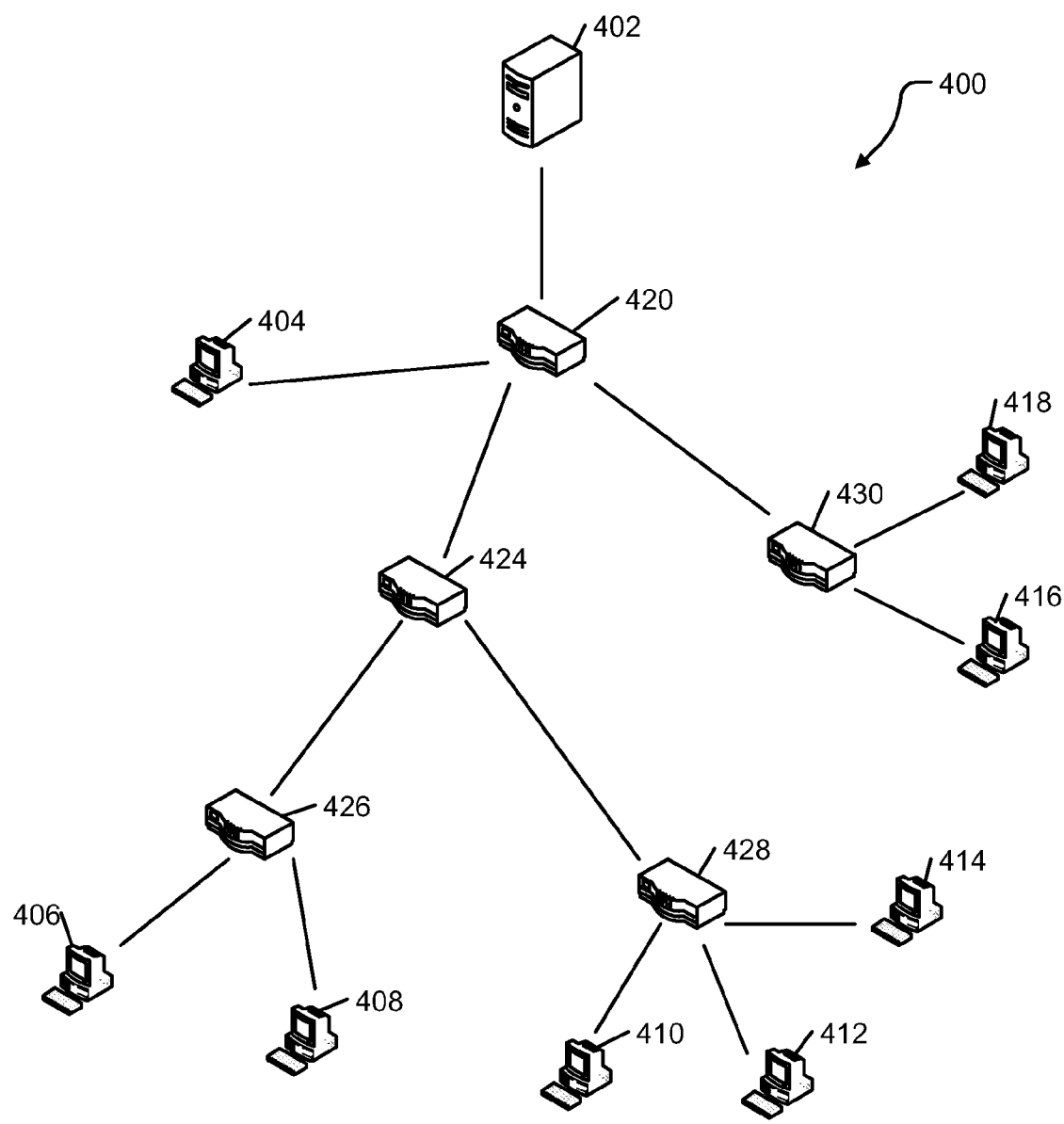
FIG. 4 is a block diagram illustrating a multicast communications network in accordance with an embodiment of the present disclosure.

FIG. 4 shows a multicast tree 400 for distributing digital content through a geographically dispersed network, such as the Internet. Multicast tree 400 can include a server 402 and client devices 404, 406, 408, 410, 412, 414, 416, and 418. Server 402 and client devices 404, 406, 408, 410, 412, 414, 416, and 418 can communicate through a network of distribution points 420, 424, 426, 428, and 430. The distribution points 420, 424, 426, 428, and 430 may be routers. Alternatively, the distribution points 420, 424, 426, 428, and 430 may be nodes of an overlay network. For example, communications from server 402 can travel through distribution points 420, 424, and 426 to client device 408 while communications from server 402 can travel through distribution points 420 and 430 to client 416. It will be appreciated that multicast tree 400 may be a logical overlay of a mesh network that, for example, may have a direct connection from distribution point 430 to 428, and also, for example, may have a direct connection from distribution point 426 to 430. These distribution points may be multicast-enabled routers. The distribution points may have the ability to cache content not only for immediate forwarding but also for later retransmission.

Server 402 can use Internet Protocol (IP) multicast or any other multicast protocol to substantially simultaneously distribute digital content to the client devices 404, 406, 408, 410, 412, 414, 416, and 418. The digital content can be divided into multiple segments or data packets that may be, but are not necessarily IP packets, Ethernet frames, or similar lower layer packets. Using a multicast protocol, each such segment or data packet can move over each link of the network only once. The distribution points 420, 424, 426, 428, and 430 can create copies, or otherwise forward incoming data on one port to multiple outbound ports, when the paths to the destinations split. For example, server 402 can send a multicast data packet to distribution point 420. Distribution point 420 can send a copy of the data packet to each of client 404, distribution point 424, and distribution point 430. Similarly, distribution point 430 can send, forward, or route a copy of the segment, data packet, or individual low layer packets to each of client devices 416 and 418, and distribution point 424 can send a copy of the data packet to each of distribution points 426 and 428. Further, distribution point 426 can send a copy of the data packet to each of client devices 406 and 408, and distribution point 428 can send a copy of the data packet to each of client devices 410, 412, and 414. In other embodiments, the network underlying multicast tree 400 may be a shared medium, such as a bus or ring, with multicast occurring at a low network layer via common physical components and a common media access structure.

Generally, the distribution points construct or join the multicast tree 400 when client devices join a multicast group, and the server 402 may not have information about each member of the multicast group. Specifically, client devices can notify the network that they are interested in receiving data packets sent to the multicast group, such as by Internet Group Management Protocol. The server 402 can send a message addressed to the multicast group and each distribution point can replicate the data packet for each system of the multicast group.

Figure 5:
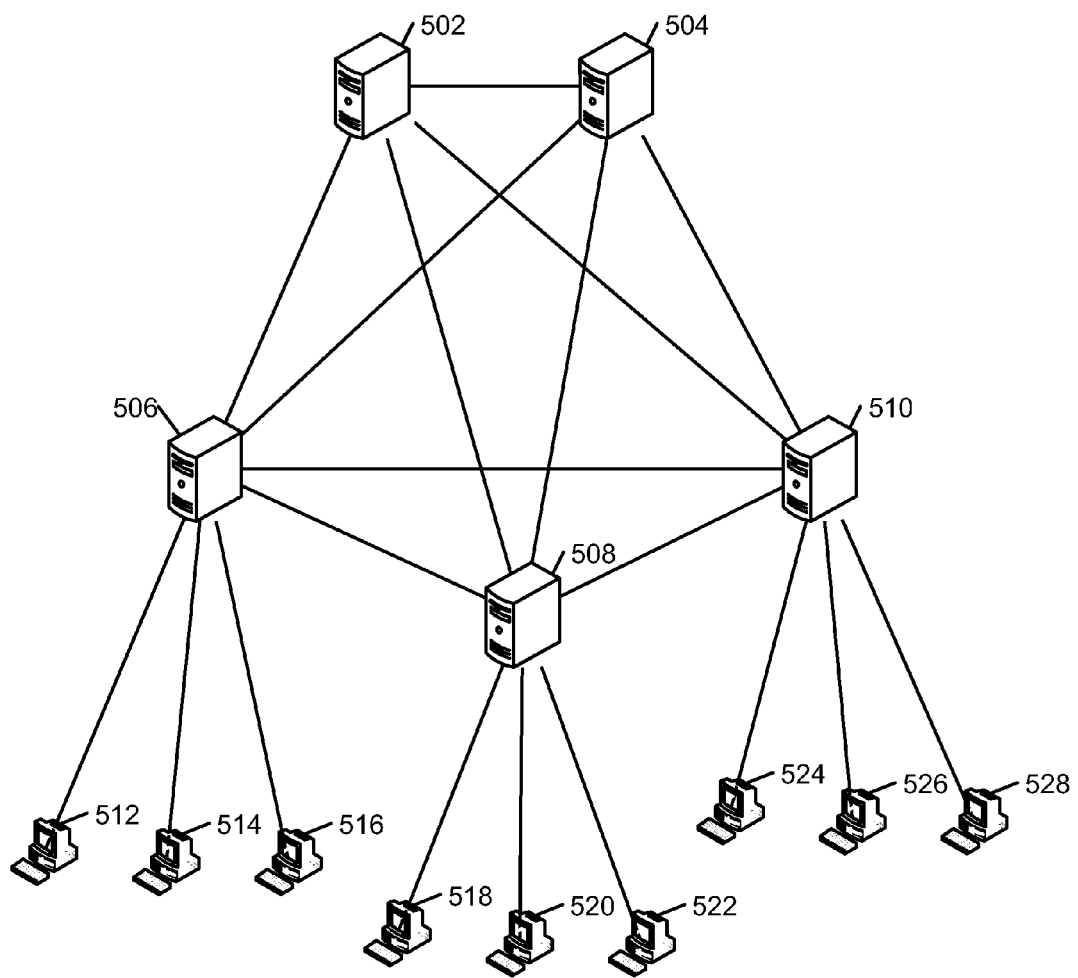
FIG. 5 is a block diagram illustrating a peer-to-peer communications network in accordance with an embodiment of the present disclosure.

FIG. 5 shows a peer-to-peer distribution network 500 for distributing digital content, such as metadata, through a geographically dispersed network, such as IPTV network 100 or network 304. The distribution network 500 can include distribution nodes 502, 504, 506, 508, and 510. Distribution nodes 502, 504, 506, 508, and 510 can collect and distribute metadata throughout distribution network 500. Additionally, client devices 512, 514, 516, 518, 520, 522, 524, 526, and 528 can obtain metadata from the distribution network 500 by contacting one of the distribution nodes 506, 508, and 510.

In an embodiment, distribution nodes 506, 508, and 510 can provide a portion of the available metadata to client devices 512, 514, 516, 518, 520, 522, 524, 526, and 528. For example, distribution node 506 can provide metadata to client devices 512, 514, and 516. The metadata can be provided as a multicast to multiple client devices 512, 514, and 516, or individually to client device 512.

Additionally, distribution nodes 506, 508, and 510 can track requests from client devices. For example, distribution node 506 may use the request information to multicast commonly requested information to a set of client devices 512, 514, and 516 that frequently request the metadata. For example, distribution node 506 may receive numerous requests from client devices 512 and 514 for information relevant to a local sports team. The distribution node 506 can provide the metadata related to the local sports team as a multicast to the client devices 512 and 514.

Further, distribution node 506 may use the information about commonly requested metadata to identity types of metadata that would be desirable to the users. Further, the request information may be useful in evaluating the value of sources of metadata. For example, frequent requests for viewer movie reviews may indicate obtaining reviews from a source that specializes in viewer movie reviews, while limited requests for viewer movie reviews may indicate a limited value to obtaining information from such a specialized source.

Figure 6:
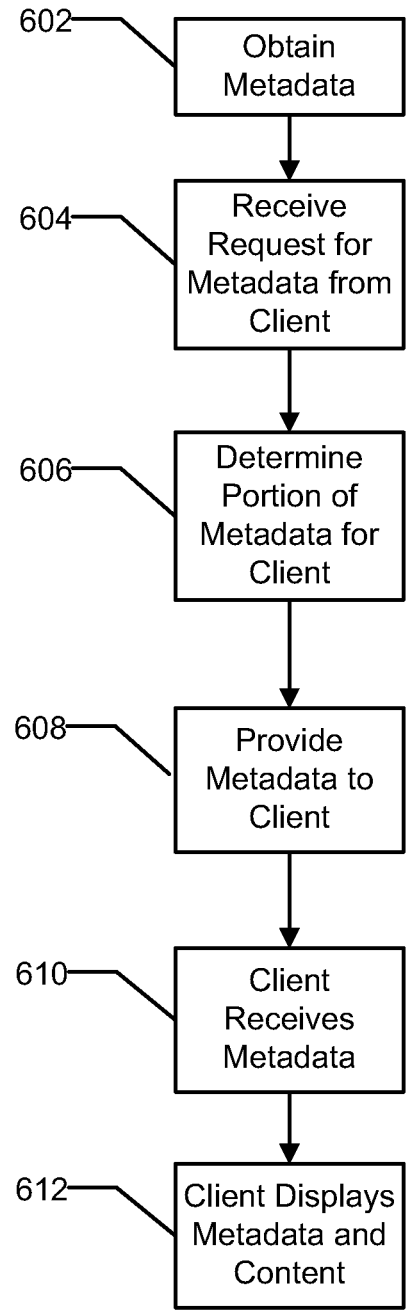
FIG. 6 is a flow diagram illustrating a method of distributing and utilizing metadata in accordance with an embodiment of the present disclosure.

FIG. 6 shows an exemplary method of distributing and processing metadata. At 602, a distribution node, such as distribution node 506, can obtain metadata. The metadata can include a description of available content. The description can include a general description of the content, a description of a segment of the content, commentary on the content or a segment thereof, or any combination thereof. The description of a segment of the content can include a description of a new story from a news cast, a scene of a movie, a news story from a news program, one of a plurality of available camera angles, a portion of a sporting event, or the like. For example, the portion of the sporting event can include a play of a football game, a heat of a meet, an at bat of a baseball game, or the like. The commentary on the content or a segment of the content can include social commentary, such as from a social network like Facebook or Twitter, or professional commentary, such as from movie critics or sports announcers.

At 604, the distribution node can receive a request from a client device for metadata. The request can include client device information such as a regional identifier, a user profile, and additional preference information. The user profile can include information about viewing habits, preferred shows, topics of interest, favorite actions, favorite athletes or sports teams, or the like. In a particular embodiment, the request can include members of a fantasy sports team. In another particular embodiment, the request can include a current topical search.

At 606, the distribution node can determine a relevant portion of the metadata based on the client device information. In an embodiment, portions of the metadata, such as programming information for a local broadcaster, can be targeted to particular geographic regions. The relevant portion of the metadata can include portions targeted to the geographic region matching a regional identifier and exclude portions targeted to other geographic regions. In another embodiment, the relevant portion of the metadata can include metadata matching the user profile or other preference information, such as viewing preferences, favorite actors, athletes, and musicians, and topics of interest.

At 608, the distribution node can send the relevant portion of the metadata to the to the client device. The metadata can be sent to the client device as individually, or popular portions of the metadata can be sent as a multicast so that multiple client devices can receive the metadata simultaneously. For example, basic metadata information, such as a programming guide can be multicast to all client devices within a region, whereas specialized metadata, such as information related to members of a fantasy sports team, can be sent to an individual client device.

At 610, the client device can receive the relevant portion of the metadata, and at 612, the client device can display the metadata, content related to the metadata, or any combination thereof. For example, the client device can display content and can display metadata scrolling along the bottom or top of the content.

In an embodiment, the client device can identify content to be displayed based on the metadata. In one example, the client device may display one content stream while monitoring the metadata for other content of interest. When other relevant content is identified, the client device may notify the user of the other relevant content and may display the other relevant content, such as when prompted by the user. Additionally, the client device may capture and store the other relevant content for later display.

In another embodiment, the client device can simultaneously display multiple content streams, such as multiple sporting events, multiple news casts, multiple unrelated relevant content streams, and the like. Generally, one content stream is an active content stream and the client device can provide audio from the active content stream, while only providing video from other non-active content streams. When the metadata indicates one of the non-active content streams has relevant content, such as a news story matching a topic of interest or a segment of a sporting event with a favorite athlete, the client device can highlight the non-active stream with relevant content so the user can easily identify and make the content active. For example, a user can be viewing multiple news cast and have an interest in the local weather forecast. When the local weather segment of a non-active news cast starts, the client device can highlight the non-active newscast, and the user can make the local weather segment the active content stream. Additionally, the client device may buffer or record the multiple streams so that the user can rewind a relevant segment of content.

In another embodiment, the client device can provide the metadata information to a supplemental display device, so that the metadata can be displayed on the supplemental display device substantially simultaneously with the content being display on a primary display. The supplemental display device can be a tablet device, a smart phone, a remote control, or any combination thereof. For example, the supplemental display device can display social commentary about the content being displayed on the primary display. Additionally, the supplemental display device can display information about the actors or athletes, such as biographical and statistical information. In another example, the primary display device may display one or more sporting events while the supplemental display device displays scores from additional sporting events, statistics of an active sporting event, or social commentary about an active sporting event or a participating team or athlete. In yet another example, a presidential address may be displayed on the primary display device while the supplemental display device displays related supplemental information or commentary from politicians, political commentators, and social networks.

Figure 7:
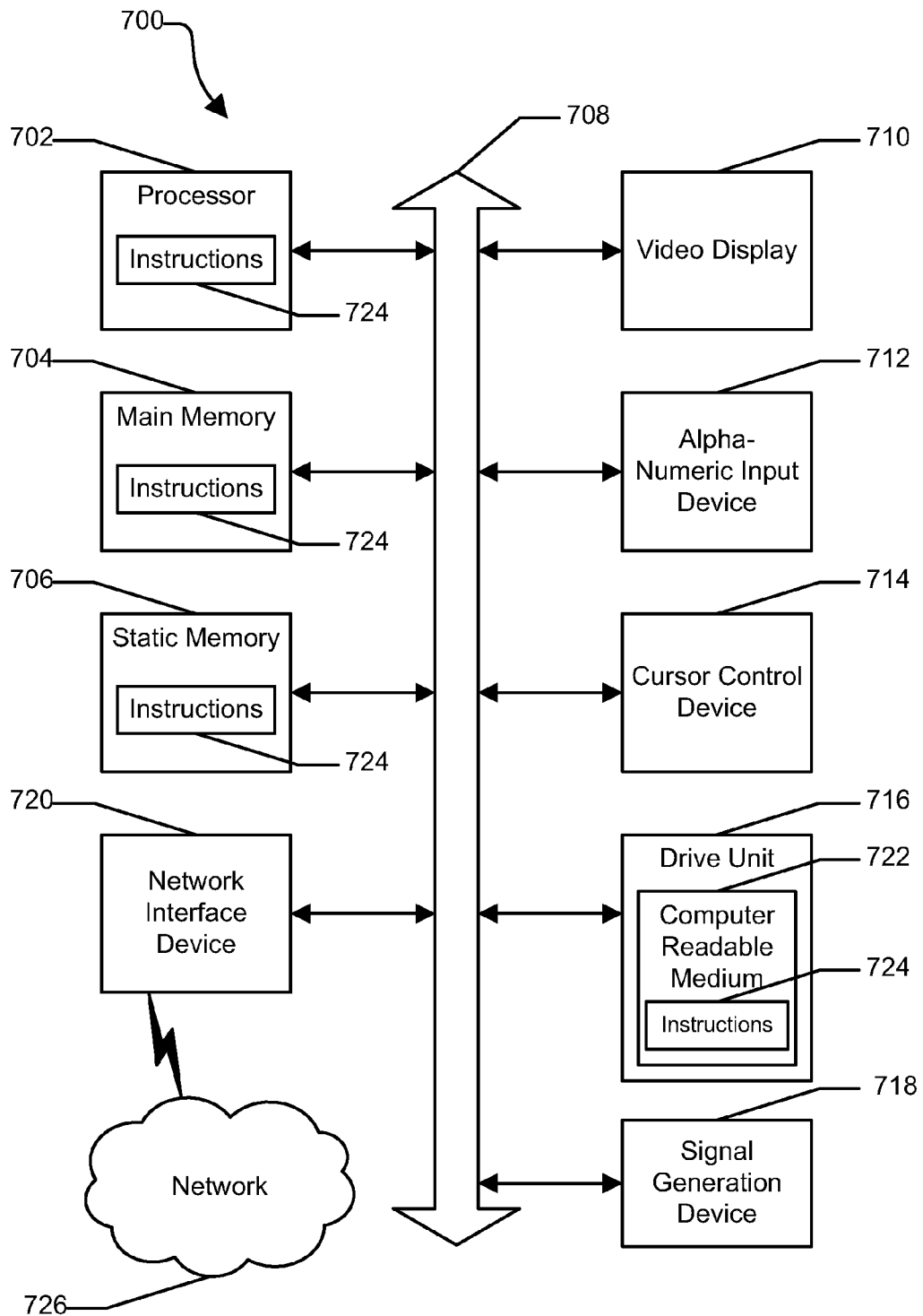
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices. Examples of the general computer system can include set-top box 204, supplemental display device 208, content server 304 or 402, metadata server 308, distribution point 420, client device 302, 410 or 512, distribution node 506, and the like.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising: a memory that stores metadata, the metadata including description information selected from the group consisting of a description of a segment of a content item, social commentary on the content item, and any combination thereof; and a processor that executes instructions to perform operations comprising: receiving a user profile from a client device, the profile including information selected from the group consisting of a regional identifier, a user preference, a user history, and any combination thereof; identifying a portion of the metadata based on the user profile; providing the portion of the metadata to the client device; identifying a commonly requested portion of the metadata and providing the commonly requested portion of the metadata as a multicast to multiple client devices; determining, based on the metadata, if a portion of a non-active content stream displayed on the client device includes content relevant to the user profile; providing an indication when the non-active content stream is determined to include the relevant content, wherein the non-active content stream with the relevant content is highlighted when the indication is provided, wherein the indication enables the client device to change the non-active content stream to an active content stream: and wherein the active content stream and the metadata are displayed synchronously based on a first timestamp of the active content stream and a second timestamp of the metadata.

2. The system of claim 1, wherein the segment of the content item is selected from the group consisting of a portion of a sporting event, a scene of a movie, a news story from a news program, one of a plurality of available camera angles, and a music video.

3. The system of claim 2, wherein the portion of the sporting event includes a play of a football game, a heat of a meet, and an at bat of a baseball game.

4. The system of claim 1, wherein identifying the portion of the metadata includes identifying metadata matching the regional identifier.

5. The system of claim 1, wherein the operations further comprise collecting tracking data including the popularity of portions of the metadata.

6. The system of claim 5, wherein the tracking data is used to evaluate the usefulness of sources of metadata and to identify additional sources of metadata.

7. A method of distributing metadata, comprising: receiving a user profile from a client device; receiving the metadata, the metadata including description information selected from the group consisting of a description of a segment of a content item, social commentary on the content item, and any combination thereof; identifying, by utilizing instructions from memory that are executed by a processor, a portion of the metadata based on the user profile; providing the portion of the metadata to the client device; identifying a commonly requested portion of the metadata and providing the commonly requested portion of the metadata as a multicast to multiple client devices; determining, based on the metadata, if a portion of a non-active content stream displayed on the client device includes content relevant to the user profile; providing an indication when the non-active content stream is determined to include the relevant content, wherein the non-active content stream with the relevant content is highlighted when the indication is provided, wherein the indication enables the client device to change the non-active content stream to an active content stream, and wherein the active content stream and the metadata are displayed synchronously based on a first timestamp of the active content stream and a second timestamp of the metadata.

8. The method of claim 7, wherein the user profile includes information selected from the group consisting of a regional identifier, a user preference, a user history, and any combination thereof.

9. The method of claim 7, wherein the segment of a content item is selected from the group consisting of a portion of a sporting event, a scene of a movie, a news story from a news program, one of a plurality of available camera angles, and a music video.

10. The method of claim 9, wherein the portion of the sporting event includes a play of a football game, a heat of a meet, and an at bat of a baseball game.

11. The method of claim 7, further comprising collecting tracking data including the popularity of portions of the metadata.

12. The method of claim 11, wherein the tracking data is used to evaluate the usefulness of sources of metadata and to identify additional sources of metadata.

\* \* \* \* \*